United States Patent

Ish

(10) Patent No.: US 8,321,635 B2
(45) Date of Patent: Nov. 27, 2012

(54) SYNCHRONIZING COMMANDS FOR PREVENTING DATA CORRUPTION

(75) Inventor: Mark Ish, Sandy Springs, GA (US)

(73) Assignee: LSI Corporation, Milpitas, CA (US)

( * ) Notice: Subject to any disclaimer, the term of this patent is extended or adjusted under 35 U.S.C. 154(b) by 170 days.

(21) Appl. No.: 12/956,952

(22) Filed: Nov. 30, 2010

(65) Prior Publication Data

US 2012/0117332 A1    May 10, 2012

Related U.S. Application Data

(60) Provisional application No. 61/411,267, filed on Nov. 8, 2010.

(51) Int. Cl.
*G06F 12/16* (2006.01)

(52) U.S. Cl. ........ 711/145; 711/141; 711/163; 711/167; 711/168; 714/3

(58) Field of Classification Search ................. 711/141, 711/145, 163, 167, 168; 714/3
See application file for complete search history.

(56) References Cited

U.S. PATENT DOCUMENTS

| 5,297,269 | A  | * | 3/1994  | Donaldson et al. | 711/145 |
|-----------|----|---|---------|------------------|---------|
| 6,018,487 | A  | * | 1/2000  | Lee et al.       | 365/204 |
| 6,920,532 | B2 | * | 7/2005  | Glasco et al.    | 711/141 |
| 7,747,822 | B1 | * | 6/2010  | Favor et al.     | 711/125 |
| 7,747,996 | B1 | * | 6/2010  | Dice             | 717/169 |
| 7,774,569 | B1 |   | 8/2010  | Chatterjee et al. |        |
| 2002/0099833 | A1 | * | 7/2002  | Steely et al.   | 709/228 |
| 2007/0245099 | A1 | * | 10/2007 | Gray et al.     | 711/156 |

* cited by examiner

*Primary Examiner* — Jae Yu
(74) *Attorney, Agent, or Firm* — Yee & Associates, P.C.

(57) ABSTRACT

A method and apparatus for synchronizing input/output commands is provided. An incoming command mask representing an incoming input/output command associated with a memory region is created. In response to a determination that a pending input/output command associated with the memory region is pending, a bitwise inversion operation is performed on the incoming command mask to form a modified incoming command mask. A bitwise AND operation is performed on the modified incoming command mask and the pending command mask to form a pending command locking mask associated with the pending input/output command. A bitwise OR operation is performed between an existing memory lock for a same type of commands and incoming command bit mask to form a new memory region lock.

20 Claims, 8 Drawing Sheets

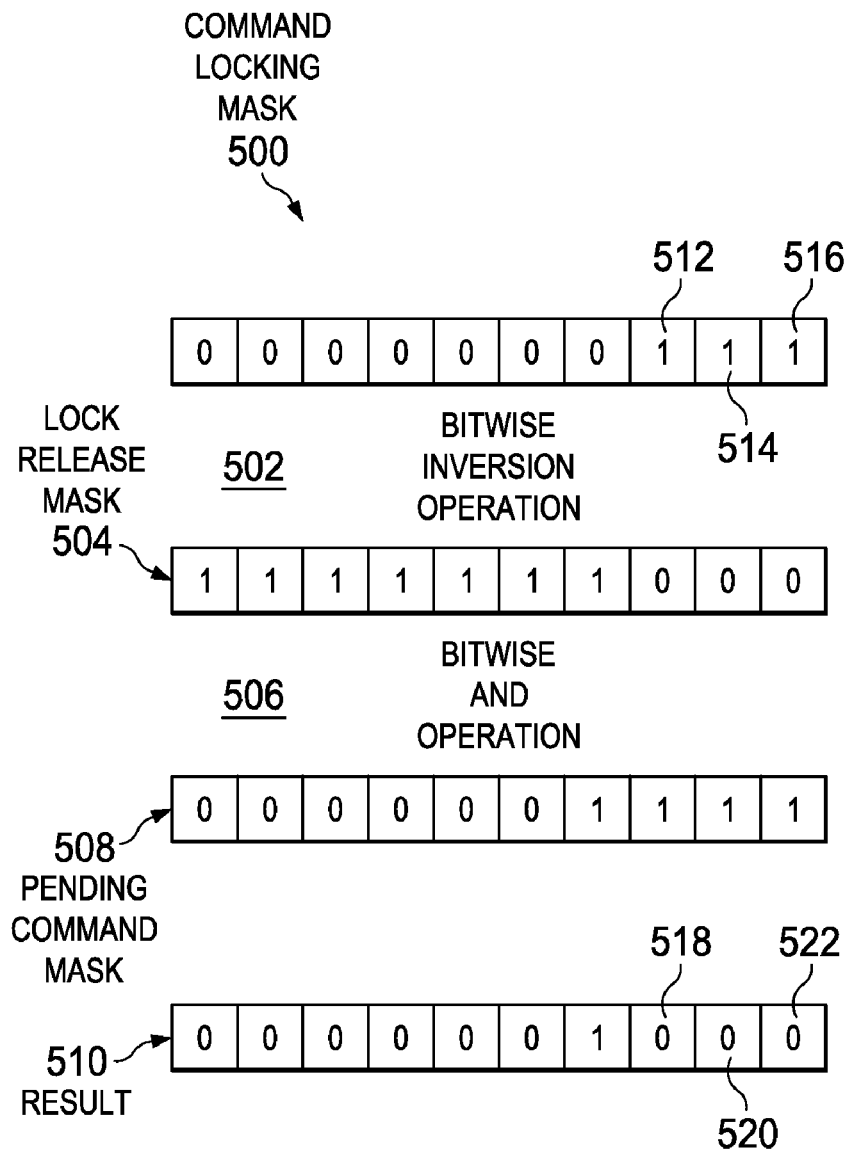

SYNCHRONIZING COMMANDS FOR PREVENTING DATA CORRUPTION

RELATED PROVISIONAL APPLICATION

This application is related to and claims the benefit of priority of provisional U.S. Patent Application Ser. No. 61/411,267, entitled "Synchronizing Commands for Preventing Data Corruption", filed on Nov. 8, 2010, which is hereby incorporated by reference.

BACKGROUND OF THE INVENTION

1. Technical Field

The present invention is directed generally to data processing systems and, in particular, to synchronizing commands. Still more particularly, the present disclosure relates to a method and apparatus for synchronizing commands to prevent data corruption.

2. Description of the Related Art

Data processing systems typically copy data from a permanent storage location into cache memory prior to performing an operation on the data, such as a read or a write operation. Data is copied into cache so that future requests for that data can be served faster. In data processing systems supporting multiple threads of execution, there is a possibility that data in the same memory region in cache may be accessed simultaneously by different processes. When one process updates or otherwise alters the data in cache, any other processes reading or writing to that same data region may be working on an out-of-date, invalid, or corrupted copy of the data.

A locking mechanism may be utilized for storage processors to provide for execution of host commands to the same region of memory in order to prevent data corruption. A lock is a synchronization mechanism for limiting access to the same region of memory. A read lock may be used to prevent writes to a particular region of memory. Likewise, a write lock may be used to prevent other processes from reading the region of memory while changes are being made to the region of memory.

Most locking mechanisms construct elaborate structures to expedite locking and unlocking regions of storage that have multiple outstanding read commands and/or write commands. For example, locking mechanisms may utilize Adelson-Velskii (AVL) trees, sequencing commands, and bit maps. These locking mechanisms require searching of outstanding commands in order to keep the bit maps correct, parsing of still pending commands to reset the lock mask, and/or re-balancing AVL trees and other complicated structures that require multiple steps to reset the locks.

Therefore, it would be advantageous to have a method and apparatus that takes into account one or more of the issues discussed above, as well as possibly other issues.

SUMMARY OF THE INVENTION

The different illustrative embodiments provide a method, computer program product, and apparatus for synchronizing input/output commands. In one embodiment, an incoming command mask representing an incoming input/output command associated with a memory region is created. In response to a determination that a pending input/output command associated with the memory region is pending, a bitwise inversion operation is performed on the incoming command mask to form a modified incoming command mask. A bitwise AND operation is performed on the modified incoming command mask and the pending command mask to form a pending command locking mask associated with the pending input/output command. A bitwise OR operation is performed between an existing memory lock for a same type of commands and incoming command bit mask to form a new memory region lock.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 is a block diagram of a command locking mask in accordance with an illustrative embodiment;

DETAILED DESCRIPTION

Figure 1:
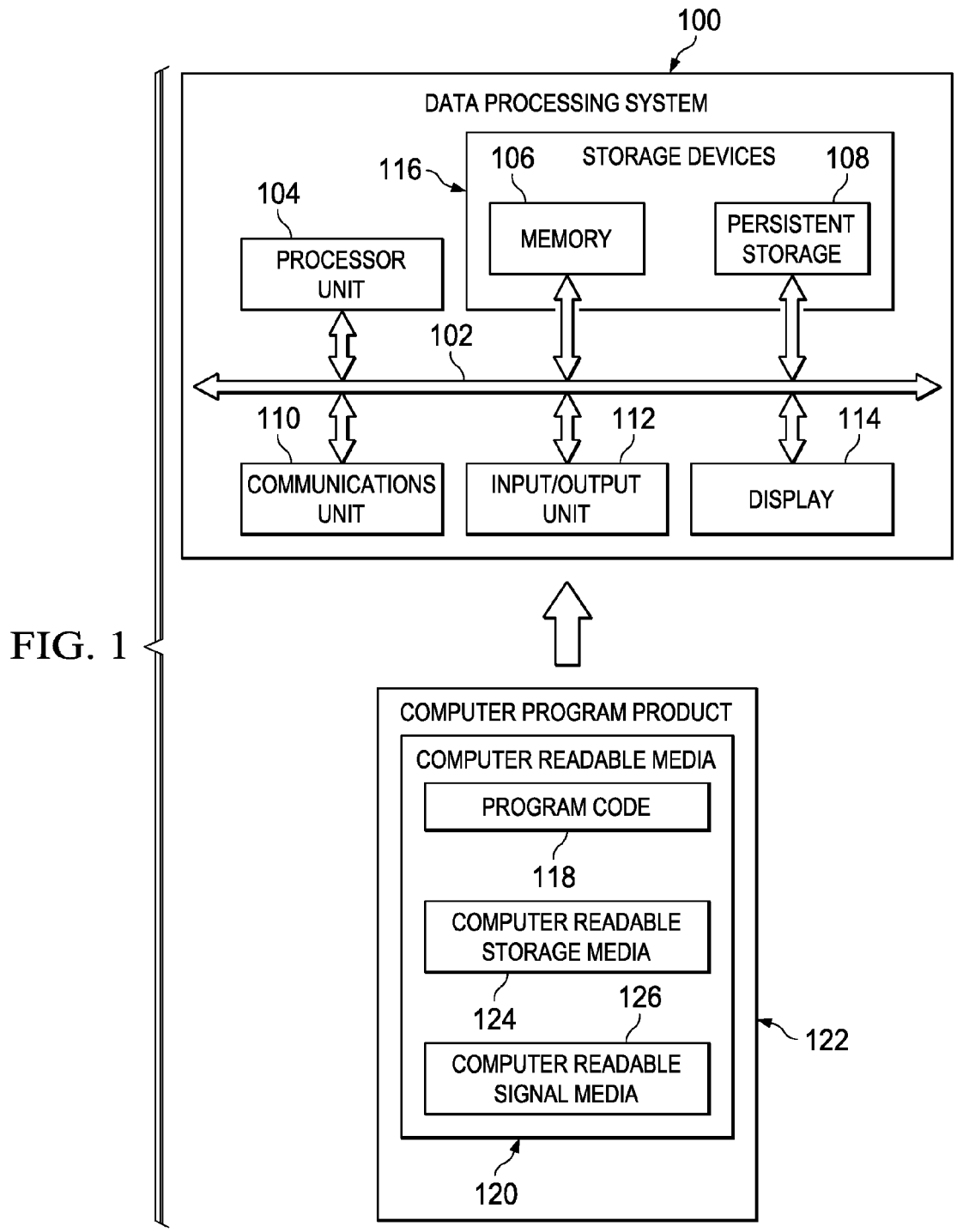
FIG. 1 is an illustration of a data processing system in accordance with an illustrative embodiment.

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

The illustrative embodiments recognize and take into account a number of different considerations. For example, the illustrative embodiments recognize and take into account that most locking mechanisms construct elaborate structures in order to expedite locking and unlocking regions of storage that have multiple outstanding commands. This is done so no read command issued prior to a write command will fall behind that write and create a data corruption. A read command may also be referred to as an output command. A write command may also be referred to as an input command.

The illustrative embodiments recognize and take into account that data corruption due to multiple read and write commands is prevalent in caching implementations because accesses to the same region get services quickly by dynamic random access memory (DRAM). Therefore, it is quite possible to have an out of order execution of commands to provide improvements in performance. The embodiments recognize that the order of commands coming to the same or overlapping regions must be preserved and the commands outside of these regions must be allowed to proceed.

Therefore, the different illustrative embodiments provide a method and apparatus for synchronizing input/output commands. An input/output command is a command that is either a read command or a write command.

In one embodiment, an incoming command mask representing a first input/output command associated with a memory region is created. In response to a determination that a second input/output command associated with the memory region is pending, two operations are performed. First, the memory region lock mask is updated by performing a bitwise OR operation between the second input/output command and the memory region lock mask. A bitwise OR operation takes two bit fields (masks) and performs a logical OR operation on each pair of corresponding bits. The result is one (1) if one of the bits in the pair is one (1). The result is zero (0) if both bits in the pair are zeroes (0s).

The second operation is to modify the first command locking mask. A bitwise inversion operation is performed on the second bit field command mask to form a modified incoming command mask. The inversion operation takes a single bit and inverts it. The result is a one (1) if the bit is a zero (0). The result is a zero (0) if the bit is a one (1).

A bitwise AND operation is performed on the modified incoming command mask and the second bit field command mask to form a first command locking mask associated with the first input/output command. A bitwise AND operation takes two bits and performs a logical AND operation on each pair of corresponding bits. The result is a one (1) if both bits in the pair are ones (1s). The result is a zero (0) if one bit in the pair is a zero (0) or if both bits in the pair are zeros (0s).

In response to completing execution of the first input/output command, the first command locking mask is used to release a lock on the memory region associated with the first input/output command in a single instruction. In other words, the command synchronization may, for example and without limitation, maintain a locking mask for a given memory region. Each input/output command also maintains its own mask for setting and releasing the memory region locks upon issuance and completion of the command.

In another embodiment, a data processing system for synchronizing input/output commands is provided. The data processing system may include a storage device containing program code and a processor unit configured to execute the program code to create an incoming command mask representing an incoming input/output command associated with a memory region. As used herein, the term "command mask" refers to a bit field command mask.

The processor unit is configured to execute the program code to perform a bitwise inversion operation on the incoming command mask to form a modified incoming command mask in response to a determination that another input/output command associated with the memory region is pending. The processor unit is configured to execute the program code to perform a bitwise AND operation on the modified incoming command mask and the pending command mask to form a pending command locking mask associated with the pending input/output command. The processor unit is configured to execute the program code to perform a bitwise OR operation between existing memory lock for same type of commands and modified incoming command mask to form a new memory region lock.

With reference now to the figures and in particular with reference to FIG. 1, an illustration of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106, such as input commands and output commands. Processor unit 104 may also serve to execute bitwise operations, such as, without limitation, bitwise exclusive OR operations and bitwise AND operations.

Processor unit 104 may be a number of processors, a multi-processor core, or some other type of processor, depending on the particular implementation. A number, as used herein with reference to an item, means one or more items. Further, processor unit 104 may be implemented using a number of heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, and program code in functional form, and/or other suitable information either on a temporary basis and/or a permanent basis. Storage devices 116 may also be referred to as computer readable storage devices in these examples. Memory 106, in these examples, may be, for example, a random access memory (RAM), dynamic random access memory (DRAM) or any other suitable volatile or non-volatile storage device. Persistent storage 108 may take various forms, depending on the particular implementation.

For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications, and/or programs may be located in storage devices 116, which are in communication with processor unit 104 through communications fabric 102. In these illustrative examples, the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or computer readable storage media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be computer readable storage media 124 or computer readable signal media 126.

Computer readable storage media 124 may include, for example, an optical or magnetic disk that is inserted or placed into a drive or other device that is part of persistent storage 108 for transfer onto a storage device, such as a hard drive, that is part of persistent storage 108. Computer readable storage media 124 also may take the form of a persistent storage, such as a hard drive, a thumb drive, or a flash memory, that is connected to data processing system 100. In some instances, computer readable storage media 124 may not be removable from data processing system 100. In these illustrative examples, computer readable storage media 124 is a non-transitory computer readable storage medium.

Alternatively, program code 118 may be transferred to data processing system 100 using computer readable signal media 126. Computer readable signal media 126 may be, for example, a propagated data signal containing program code 118. For example, computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 118 may be downloaded over a network to persistent storage 108 from another device or data processing system through computer readable signal media 126 for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different advantageous embodiments may be implemented in a data processing system including components in addition to or in place of those illustrated for data processing system 100. Other components shown in FIG. 1 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 104 may take the form of a hardware unit that has circuits that are manufactured or configured for a particular use. This type of hardware may perform operations without needing program code to be loaded into a memory from a storage device to be configured to perform the operations.

For example, when processor unit 104 takes the form of a hardware unit, processor unit 104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 118 may be omitted because the processes for the different embodiments are implemented in a hardware unit.

In still another illustrative example, processor unit 104 may be implemented using a combination of processors found in computers and hardware units. Processor unit 104 may have a number of hardware units and a number of processors that are configured to run program code 118. With this depicted example, some of the processes may be implemented in the number of hardware units, while other processes may be implemented in the number of processors. As another example, a storage device in data processing system 100 is any hardware apparatus that may store data. Memory 106, persistent storage 108, and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106, or a cache, such as found in an interface and memory controller hub that may be present in communications fabric 102.

Figure 2:
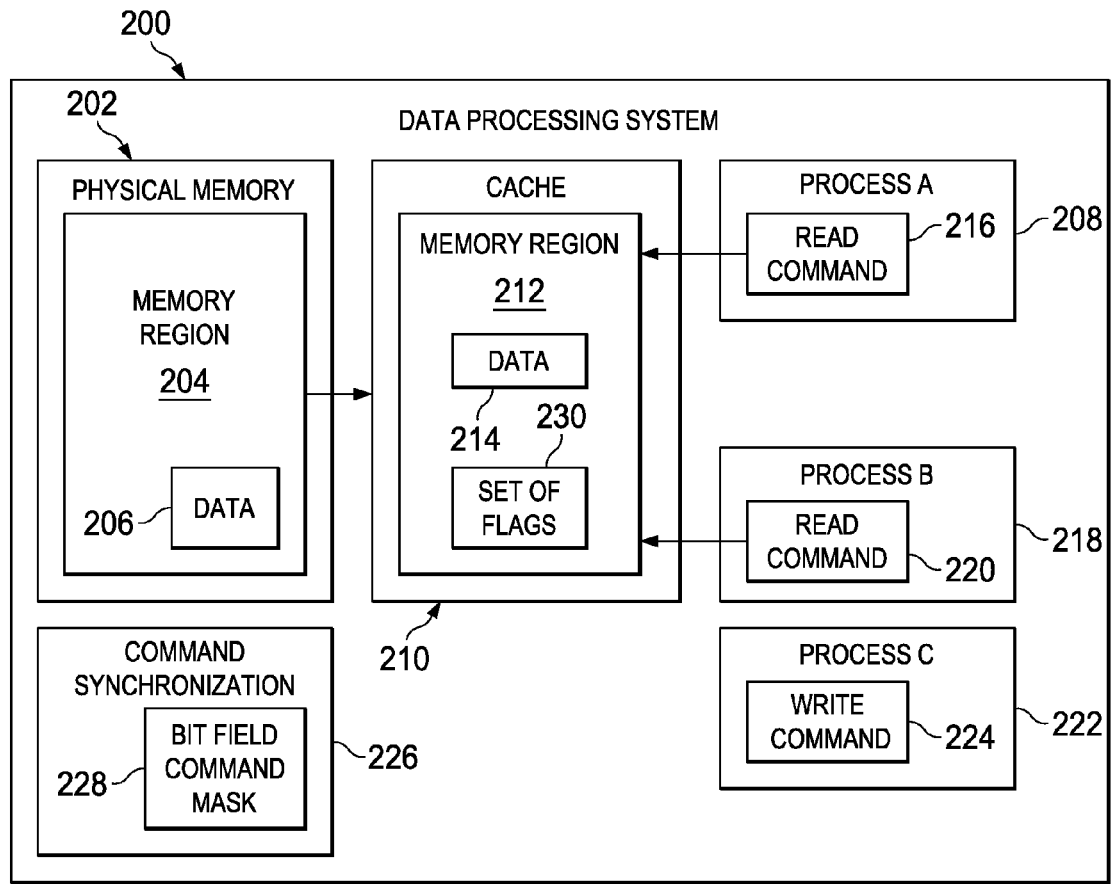
FIG. 2 is a block diagram of a data processing system providing input/output command synchronization for execution of multiple commands to the same memory region in accordance with an illustrative embodiment.

FIG. 2 is an illustration of a data processing system providing input/output command synchronization for execution of multiple commands to the same memory region in accordance with an illustrative embodiment. Data processing system 200 may be implemented as any type of computing device, such as, without limitation, data processing system 100 in FIG. 1. Data processing system 200 is capable of executing multiple threads simultaneously.

Physical memory 202 is a physical data storage device for storing information, such as, without limitation, memory 106 and/or persistent storage 108 in FIG. 1. Physical memory 202 includes memory region 204 storing data 206. Memory region 204 is a zone or area within physical memory 202. Memory region 204 spans a contiguous range of memory addresses within physical memory 202.

When process A 208 wants to perform a read or write operation on data 206, process A 208 checks cache 210 to determine if memory region 204 is in cache 210. Cache 210 may be implemented on any type of cache memory. In one embodiment, but without limitation, cache 210 may be associated with a virtual drive divided into equal number of regions. Each region has the same number of equal size cache lines.

Data processing system 200 determines if data 206 is in cache 210 by comparing the address of memory region 204 to all tags in cache 210 that might contain that address. If memory region 204 is not in cache 210, it is a cache miss. If there is a cache miss, memory region 204 and data 206 is copied into cache 210 to create memory region 212 having data 214. Cache 210 stores data 214 in memory region 212 so that future requests for data 214 can be served faster than if data 206 has to be pulled from physical memory 202.

At the time memory region 212 is created in cache 210, memory region 212 is an identical copy of memory region 204. However, process A 208 or another process may perform a write operation on the cached copy memory region 212 and change data 214 in cache 210 so that it is no longer an exact copy of memory region 204.

If process A 208 checks cache 210 and finds a copy of memory region 204 already in cache 210, that is referred to as a cache hit. If there is a cache hit, process A 208 may immediately read or write to data 214 in memory region 212 in cache 210 without the delay inherent in accessing data 206 from physical memory 202.

In this example, process A 208 is a read command 216 that wants to read data 214. Process B 218 is another process having a pending input/output command of the same type as process A 208. In other words, process B 218 includes a read command 220 that wants to read data 214. Process C 222 is yet another pending process having an input/output command. Here, the input/output command associated with process C 222 is a write command 224 that wants to write to data 214. In other words, write command 224 is a command that wants to make changes or modifications to data 214.

Command synchronization 226 is a software component that creates bit field command mask 228 for each incoming input/output command affecting the same memory region, such as read command 216, read command 220, and write command 224. Bit field command mask 228 may be created using any known method for creating a bit field command mask.

In one embodiment, but without limitation, the number of cache lines in memory region 212 is, for example and without limitation, thirty-two (32) bits. This number is chosen purely for ease of use reasons because it represents a single unsigned integer allocation of thirty-two (32) bits. However, the embodiments are not limited to thirty-two cache lines in memory region 212. The embodiments may be implemented with a different number of cache lines in memory region.

The command synchronization 226 may create bit field command mask 228 for an incoming input/output command by identifying a starting cache line in memory region 212 that is affected by the input/output command. Command synchronization 226 then identifies an ending cache line in memory region 212 that is affected by the input/output command. Command synchronization 226 initially sets all bits in bit field command mask 228 for the input/output command to ones (1s). Command synchronization 226 then shifts the bits left thirty-one (31), which represents the number of cache lines in memory region 212 minus one because the count of lines goes from zero (0) to thirty-one (31) for thirty-two (32) bit masks, minus the ending cache line number to mask off all the upper bits. Command synchronization 226 then shifts the bits right thirty-one (31) minus the ending cache line number plus the starting cache line number to mask the lower bits. Finally, command synchronization 226 shifts the bits in the bit field command mask left the starting cache line number to form bit field command mask 228 for a given input/output command. Bit field command mask 228 indicates cache lines in memory region of interest to a given input/output command.

Set of flags 230 is a set of one or more variables associated with memory region 212. Each memory region may have a set of flags associated with it. A flag in set of flags 230 may be set to indicate a read lock, a write lock, a read queue, a write queue, a waiting queue, valid data, or dirty data. As used herein, the term "dirty data" refers to data in cache that has been modified or altered so that it no longer matches data in physical memory 202.

Command synchronization 226 creates bit field command masks for all input/output commands associated with memory region 212. Command synchronization 226 uses these bit field input/output command masks to lock memory region 204 and memory region 212 by setting read or write lock, depending on the input or output nature of the command, to the command mask for the first command that is executed for this memory region. This read lock mask or write lock mask for the region is modified by doing a bitwise OR with the bit field input/output command masks of all the subsequent commands of the same type. Type of commands may be read or write. Thus, commands of the same type as a read command will all be read and commands of the same type as a write command will all be write commands. Command synchronization 226 uses the bit field input/output command masks to release locks associated with memory region 204 and memory region 212 in a single instruction by applying a bitwise AND operation between inverted bit field of the input/output command and the appropriate read/write lock bit mask of the memory regions 204 and 212. In other words, locks associated with an input/output command are released in a single instruction when the input/output command completes execution. Command synchronization 226 allows complete parallelism of executing input/output commands without relying on complex data structures or traversing and balancing AVL trees.

Figure 3:
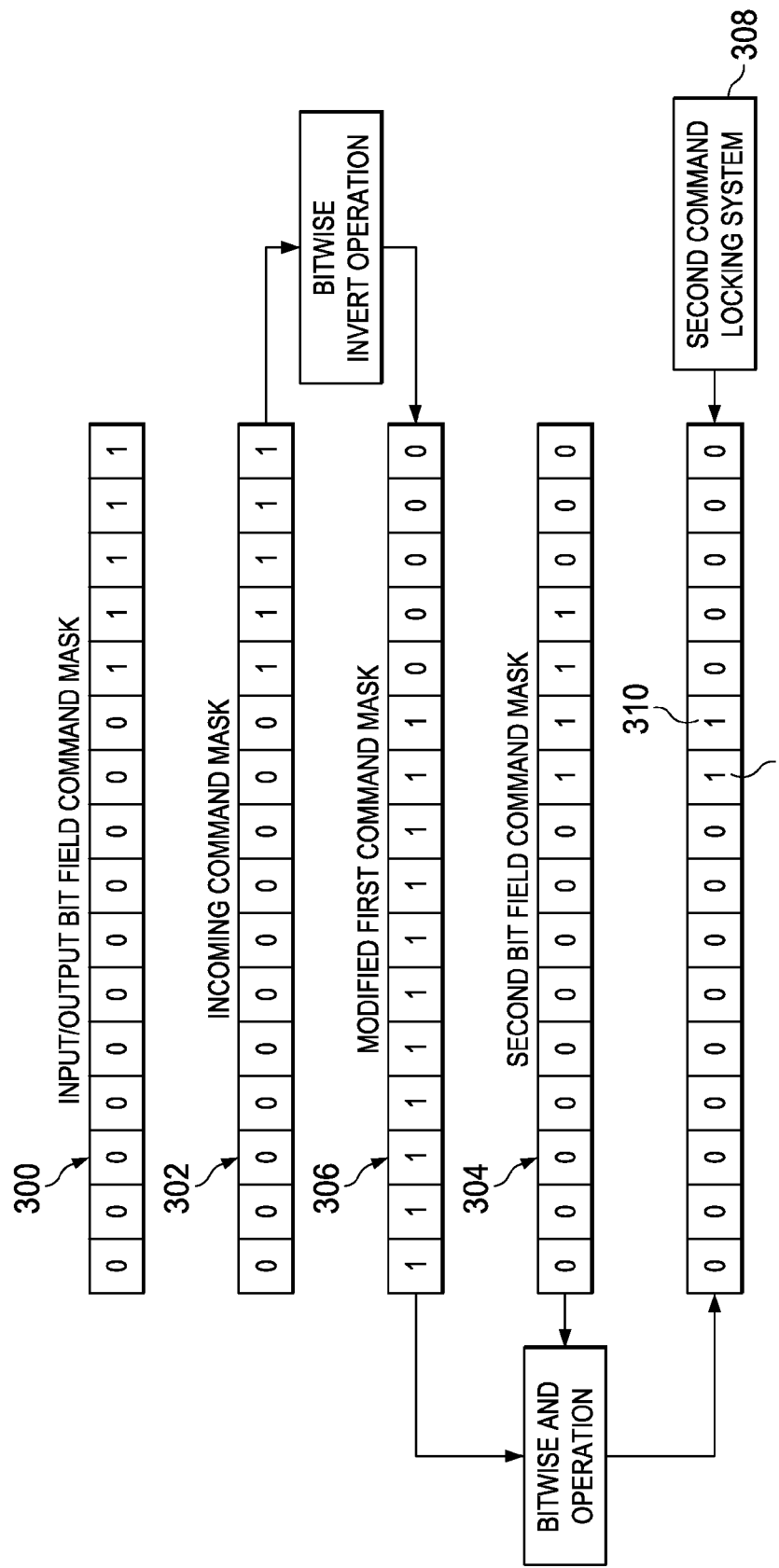
FIG. 3 is a block diagram of an input/output bit field command mask in accordance with an illustrative embodiment.

Referring now to FIG. 3, an illustration of an input/output bit field command mask is shown in accordance with an illustrative embodiment. Incoming command mask 302 is a bit field command mask representing an input/output command associated with a memory region, such as bit field command mask 228 in FIG. 2. In response to detecting multiple input/output commands associated with the same memory region, a command synchronization component, such as command synchronization 226 in FIG. 2, creates a bit field command mask representing each of the pending input/output commands. An input/output command may be a read command or a write command. A pending input/output command is any read or write command that has not completed execution. A pending input/output command may be engaged in a read operation, engaged in a write operation, waiting in a wait queue, locked out of reading or writing, or otherwise waiting to complete execution.

In this example, incoming command mask 302 represents an incoming input/output command and second bit field command mask 304 represents a prior pending input/output command associated with the same memory region. An input/output command is associated with a memory region if the input/output command wants to read data from that memory region or the input/output command wants to write or modify data in that memory region. For the purpose of this example, both commands have to be of a same type, such as the same input type or the same output type. The overall system makes read locks for output commands and write locks for input commands.

Figure 4:
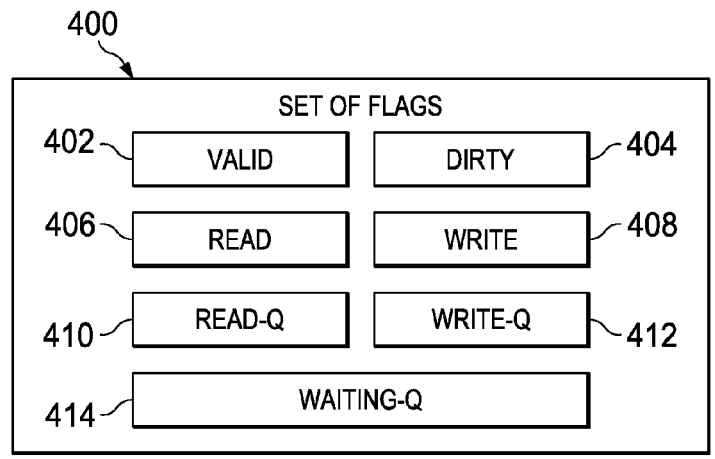
FIG. 4 is a block diagram of a set of flags associated with a memory region in accordance with an illustrative embodiment.

The command synchronization performs a bitwise inversion operation on incoming command mask 302. The result of the inversion operation on incoming command mask 302 is modified first command mask 306. The command synchronization then performs a bitwise AND operation on second bit field command mask 304 and modified first command mask 306. The result of the bitwise AND operation on second bit field command mask 304 and modified first command mask 306 is the new second command locking mask 308. Second command locking mask 308 in this example indicates a lock on the two bits 310 and 312. These two bits 310 and 312 indicate the second input/output command is only going to release the lock on the cache lines associated with bits 310 and 312 when it completes execution. The first input/output command bit mask remains the same and if no other commands are submitted that effect this memory region, the remaining locks against the cache lines indicated by the first command bit filed mask will be released upon the completion of that command FIG. 4 is an illustration of a set of flags associated with a memory region in accordance with an illustrative embodiment. Set of flags 400 is a set of variables for a memory region, such as set of flags 230 in FIG. 2.

Valid 402 is a flag represented by a bit field to signify valid data in each of the cache lines in a given memory region. Dirty 404 is a flag represented by a bit filed that identifies dirty data in each of the cache lines in this memory region. Read 406 is a flag represented by a bit field that signifies a read lock in each of the cache lines in this memory region. Write 408 is a flag represented by a bit field indicating that a write lock has been placed on each of the cache lines in this memory region. Read_q 410 is a flag represented by a memory pointer that indicates a queue of pending read commands. Write_q 412 is a flag represented by a memory pointer that signifies a queue of pending write commands. Waiting_q 414 is a flag represented by a memory pointer that signifies a queue of commands that are locked out from either reading or writing.

The overall system in this example, but without limitation, functions by first creating a bit field mask for each command using a synchronization command, such as command synchronization 226 in FIG. 2. Then checking the command bit mask against opposite memory lock. For example, if the command is a read command, the write lock is checked. Likewise, if the command is a write command, the read lock is checked.

If the command can proceed, a bitwise OR operation is performed with either Read bit field 406 or Write bit field 408, depending on whether command is an input or an output. Then bit field masks of all of the pending commands on corresponding waiting queues, Read_q 410 for read and Write_q 412 for write are modified commands according to the process in FIG. 3. Finally, the command is appended to either Read_q 410 for read or Write_q 412 for write and allowed to proceed with execution. If the command is blocked by the lock, the command is appended to the Waiting_q 414.

Turning now to FIG. 5, a block diagram of a lock release is shown in accordance with an illustrative embodiment. Command locking mask 500 is a bit field command mask representing an input/output command associated with a memory region, such as, without limitation, first command locking mask 308 in FIG. 3. When an input/output command has completed execution, the command synchronization performs a bitwise inversion operation 502 on command locking mask 500 to form lock release mask 504. Bitwise inversion operation 502 inverts each bit in command locking mask 500. In other words, bitwise inversion operation 502 converts every one (1) in command locking mask 500 to a zero (0) and converts every zero (0) in command locking mask 500 into a one (1).

The command synchronization identifies a command locking mask for a pending command of the same type associated with the same memory region as command locking mask 500. A command type may be a read type or a write type. Thus, if command locking mask 500 is associated with a read command, a command of the same type will also be a read command. Likewise, if command locking mask 500 represents a write command, a pending command of the same type will also be a write command. Here, pending command mask 508 is a bit field command mask representing a pending input/output command of the same type as the input/output command associated with command locking mask 500 and is also represented by the same type bit field mask in memory region flags, such as Read 406 and Write 408, in FIG. 4.

The command synchronization performs a bitwise AND operation 506 on inverted lock release mask 504 and pending command mask 508 to generate result 510. Result 510 represents the remaining locks still in place associated with the memory region of the same type commands, such as Read 406 and Write 408 in FIG. 4. In this example, command locking mask 500 includes the last three bits 512, 514, and 516 indicating locks associated with cache lines touched or affected by the input/output command associated with command locking mask 500. Result 510 shows the last three bits 518, 520, and 522 have been cleared. In other words, the zeros (0s) in the last three bits 518, 520, and 522 indicates release of the lock associated with those cache lines in the memory region as a result of the input/output command associated with command locking mask 500 completing execution.

Figure 6:
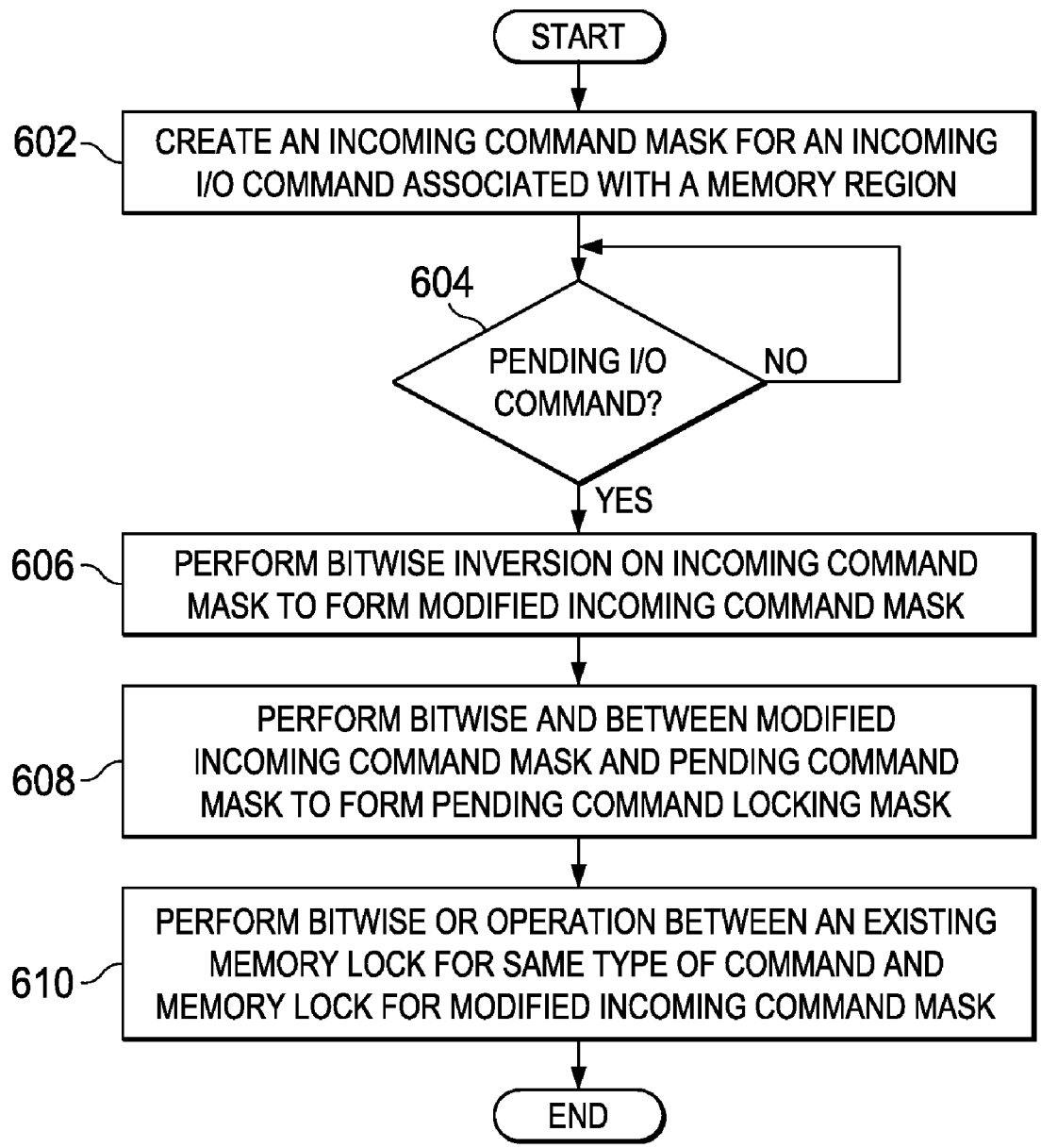
FIG. 6 is an illustration of a flowchart of a process for synchronizing input/output commands using a bit field command mask in accordance with an illustrative embodiment.

FIG. 6 is an illustration of a flowchart of a process for synchronizing input/output commands using a bit field command mask in accordance with an illustrative embodiment. The process in FIG. 6 may be implemented by a component for synchronizing input/output commands to a common memory region, such as command synchronization 226 in FIG. 2.

The process begins by creating an incoming command mask representing an incoming input/output command associated with a memory region (operation 602). The process makes a determination as to whether a pending input/output command associated with the same memory region is pending (operation 604). If no, the process returns to operation 602. If yes, the process performs a bitwise inversion operation on the incoming command mask to form a modified incoming command mask (operation 606). The process performs a bitwise AND operation on the modified incoming command mask and a pending command mask to form a pending command locking mask associated with the pending input/output command (operation 608). The process performs a bitwise OR operation between existing memory lock for same type of commands and incoming command bit mask to form a new memory region lock (operation 610) with the process terminating thereafter.

Figure 7:
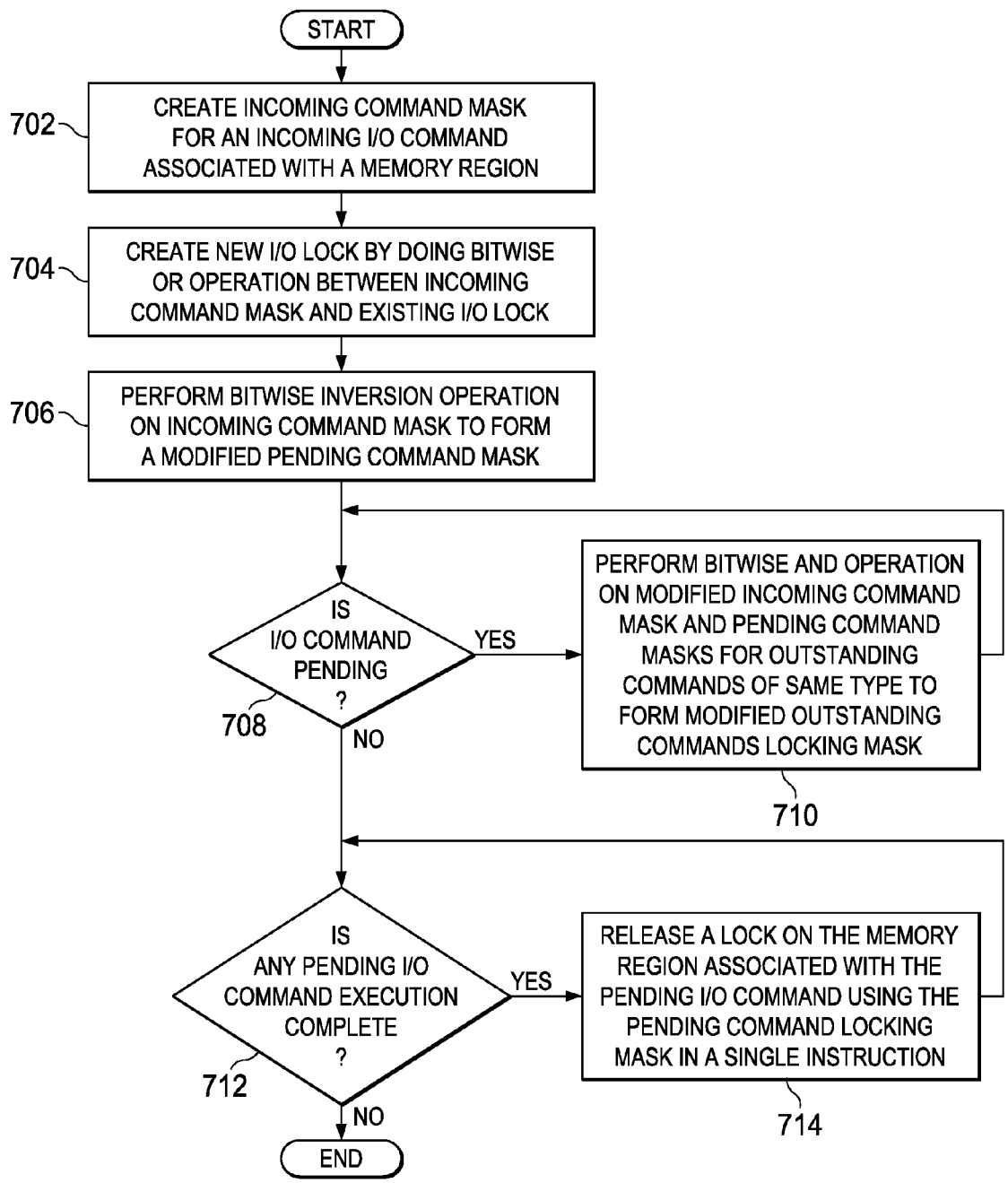
FIG. 7 is an illustration of a flowchart of a process for synchronizing input/output commands in accordance with an illustrative embodiment.

FIG. 7 is an illustration of a flowchart of a process for synchronizing input/output commands in accordance with an illustrative embodiment. The process in FIG. 7 may be implemented by a component for synchronizing input/output commands to a common memory region, such as command synchronization 226 in FIG. 2.

The process begins by creating an incoming command mask for an incoming input/output (IO) command associated with a memory region (operation 702). A bitwise OR operation between the resulting bit field mask of the incoming command and a read or write lock flag creates a new input/ output lock (operation 704). The input/output lock may be a read lock bit field mask flag or a write lock bit field mask flag.

A bitwise inversion operation is performed on the incoming command mask resulting in modified pending command mask (operation 706).

A determination is made as to whether there are any input/output commands pending (operation 708) on the read queue or the write queue, such as Read_q 410 in FIG. 4 for reads or Write_q 412 in FIG. 4 for writes. If no, the process skips to operation 712. If yes, the process performs a bitwise AND operation on the modified incoming command mask and the masks of all outstanding commands for the same type to form an outstanding commands locking masks (operation 710) for all outstanding similar commands. Commands of the same type for a write may be commands in the write queue and commands of the same type for a read may be commands in a read queue.

Returning now to step 708, if other input/output commands are not pending or after forming the outstanding commands locking masks at operation 710, the process makes a determination as to whether any pending output/input command execution is complete (operation 712). If no, the process terminates thereafter or returns to operation 702 if any more input/output commands are added.

Returning now to operation 712, if any pending input/output command execution is complete, a lock on the memory region associated with the pending input/output command is released using the pending command locking mask representing the completed input/output command in a single instruction (operation 714). The process then returns to operation 712 and terminates when all of the outstanding commands complete execution.

Figure 8:
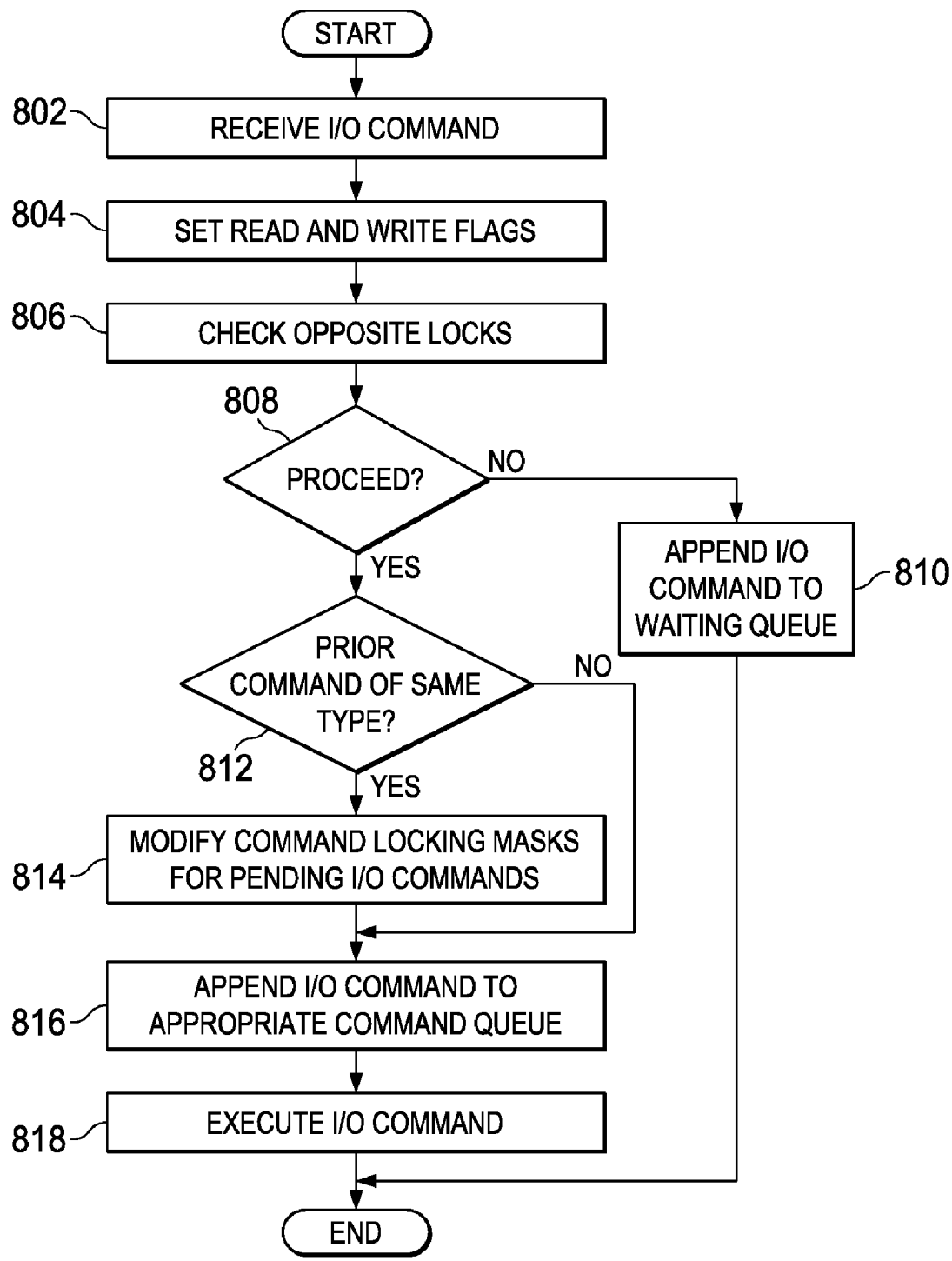
FIG. 8 is an illustration of a flowchart of a process for synchronizing commands to prevent data corruption in accordance with an illustrative embodiment.

FIG. 8 is an illustration of a flowchart of a process for synchronizing commands to prevent data corruption in accordance with an illustrative embodiment. The process in FIG. 8 may be implemented by a component for synchronizing input/output commands to a common memory region, such as command synchronization 226 in FIG. 2.

The process begins by receiving an input/output command (operation 802). The operation sets read or write flags based on the type of input/output command (operation 804). For example, the process may set a read flag, such as read 406 in FIG. 4 or a write flag such as write 408 in FIG. 4. The opposite locks are checked (operation 806). Thus, if input/output command is a read command, the write locks represented by a write flag, such as write 408 in FIG. 4, are checked. Likewise, if the input/output command is a write command, the read locks represented by a read flag, such as read 406 in FIG. 4, are checked. The check operation 806 is a simple bitwise AND between input/output command bit field mask and read 406 or write 408 flags in FIG. 4. A determination is made as to whether to proceed (operation 808) by examining the resulting bit mask from operation 806. If any bits in the resulting bit field mask are set to one (1) the input/output command is blocked. In other words, if the opposite locks block the input/output command, the input/output command cannot proceed. If there are no opposite locks blocking the input/output command, the input/output command can proceed.

If the operation does not proceed at operation 808, the input/output command is appended to the waiting queue (operation 810). A waiting queue may be represented by a flag, such as Waiting_q flag 414 in FIG. 4.

If the process can proceed at operation 808, a determination is made as to whether there is a prior command of the same type (operation 812). If the input/output command is a read command, the process checks for pending read commands represented by a flag, such as Read_q 410 in FIG. 4, for the same memory region. If the input/output command is a write command, the process checks for a prior pending write commands represented by a flag, such as Write_q 412 in FIG. 4 that are pending for the same memory region.

If there are one or more prior pending commands of the same type as input/output command, their locking masks are modified (operation 814). The locking masks may be modified using a modification method, such as, without limitation, the process shown in FIG. 5.

The input/output command is appended to the appropriate command queue (operation 816). If the input/output command is a read command, the appropriate command queue is the read queue represented by a flag, such as Read_q 410 flag in FIG. 4. If the input/output command is a write command, the appropriate command queue is the write queue represented by a write queue flag, such as Write_q 412 flag in FIG. 4. The input/output command is then allowed to proceed to execution (operation 818) with the process terminating thereafter.

Figure 9:
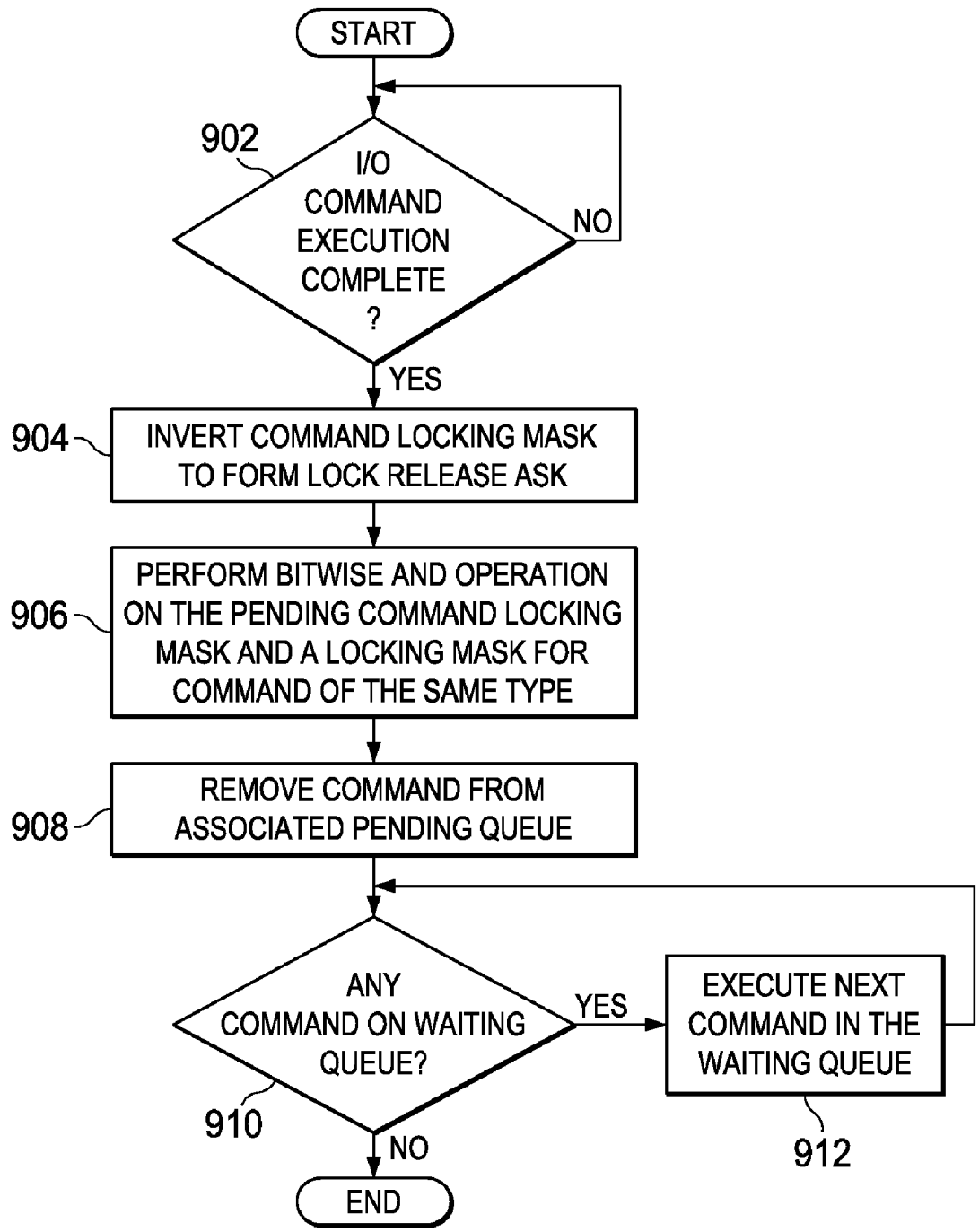
FIG. 9 is an illustration of a flowchart of a process for releasing locks on a memory region in accordance with an illustrative embodiment.

FIG. 9 is an illustration of a flowchart of a process for releasing locks on a memory region in accordance with an illustrative embodiment. The process in FIG. 9 may be implemented by a component for synchronizing input/output commands to a common memory region, such as command synchronization 226 in FIG. 2.

The process begins by determining whether an input/output command execution is complete (operation 902). If no, the process returns to operation 902 until execution of the input/output command is completed. When the input/output command execution is complete, the command locking mask is inverted to form a lock release mask (operation 904). In this example, the command locking mask is a bit field command mask associated with the input/output command that has completed execution at operation 902.

A bitwise AND operation is performed on a locking mask for a command of the same type operation and a pending command locking mask (operation 906). In this example, if the input/output command that has completed execution is a write command, the locking mask is for a write flag, such as Write 408 in FIG. 4. Likewise, if the input/output command that has completed execution is a read command, the locking mask is for a read, such as Read flag 406 in FIG. 4.

The competed command is then removed from the same type command waiting queue represented by Read_q 410 in FIG. 4 for reads and Write_q 412 in FIG. 4 for writes (operation 908).

A determination is made as to whether any command is on the waiting queue (operation 910). The waiting queue may be represented by Waiting_q flag 414 in FIG. 4. If yes, the next command in the waiting queue is removed from the waiting queue and is executed (operation 912). The next command in the waiting queue may, without limitation, be executed according to the process described in FIG. 7. Operation 910 and 912 are executed iteratively until there are no more commands on the waiting queue and the process returns to operation 902. If no command is waiting in the waiting queue at operation 910, the process terminates thereafter.

Thus, the different illustrative embodiments provide a method and apparatus for synchronizing multiple input/output commands to a common memory region to prevent data corruption. In one embodiment, an incoming command mask representing an incoming input/output command associated with a memory region is created. The lock release mask is updated by bitwise OR operation between lock release mask and an incoming command mask to form a new lock release mask, which effectively sets the lock for memory region in the area of interest for incoming input/output command. In response to a determination that another input/output command associated with the memory region is pending, a bitwise invert operation is performed on the incoming command mask to form a modified pending command mask. Upon completion of pending input/output command, a bitwise invert operation is performed on pending input/output command to form a modified pending command mask. A bitwise AND operation is performed on the modified pending command mask and lock release mask to form a new lock release mask, which effectively releases the lock in the memory region in the area of interest for just completed pending input/output command. Thus, the command locking mask is used to release a lock on the memory region associated with the input/output command in a single instruction.

Thus, the embodiments utilize bitwise inversion and bitwise "AND" operations to make a bit field command mask that can release a read or write lock associated with a particular memory region in a single instruction.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

What is claimed is:

1. A method for synchronizing input/output commands, the method comprising:
   creating an incoming command mask representing an incoming input/output command associated with a memory region;
   responsive to a determination that a pending input/output command associated with the memory region is pending, performing a bitwise inversion operation on the incoming command mask to form a modified incoming command mask;
   performing a bitwise AND operation on the modified incoming command mask and the pending command mask to form a pending command locking mask associated with the pending input/output command; and
   performing a bitwise OR operation between existing memory lock for same type of commands and incoming command bit mask to form a new memory region lock.

2. The method of claim 1 further comprising:
   responsive to completing execution of the pending input/output command, using the pending command locking mask to release the lock on the memory region associated with the pending input/output command.

3. The method of claim 1, wherein using the pending command locking mask to release the lock on the memory region associated with the pending input/output command further comprises:
   responsive to the pending input/output command completing execution, performing a bitwise inversion on the pending command locking mask to form a lock release mask; and
   performing the bitwise AND operation on the lock release mask and a pending command locking mask for a pending input/output command of the same type associated with the same memory region to release a lock on a set of cache lines of the memory region utilized by the pending input/output command.

4. The method of claim 1, wherein the lock on the memory region associated with the pending input/output command is released in a single instruction.

5. The method of claim 1 further comprising:
   executing a plurality of input/output commands associated with a common memory region in parallel, wherein each input/output command is represented by a bit field command mask in a set of bit field command masks.

6. The method of claim 4, wherein locking and unlocking cache lines in the common memory region by the plurality of input/output commands is synchronized using the set of bit field command masks to prevent data corruption.

7. The method of claim 1 wherein creating the incoming command mask representing the incoming input/output command associated with the memory region further comprises:
   setting bits in a bit field to ones;
   shifting the bits left thirty-one minus an ending cache line number for an ending cache line in the memory region to mask off a set of upper bits;
   shifting the bits right thirty-one minus an ending cache line number plus a starting cache line number for a starting cache line in the memory region to mask a set of lower bits; and
   shifting the bits in the bit field left for the starting cache line number to form the incoming command mask representing the incoming input/output command.

8. The method of claim 1 further comprising:
   creating the bit field command mask for each incoming input/output command affecting a same memory region.

9. A computer program product for synchronizing input/output commands, the computer program product comprising:
   a computer recordable storage medium;
   program code, stored on the computer recordable storage medium, for creating an incoming command mask representing an incoming input/output command associated with a memory region;
   program code, stored on the computer recordable storage medium, for performing a bitwise invert operation on the incoming command mask to form a modified incoming command mask in response to a determination that a pending input/output command associated with the memory region is pending;
   program code, stored on the computer recordable storage medium, for performing a bitwise AND operation on the modified incoming command mask and the pending command mask to form a pending command locking mask associated with the pending input/output command; and
   program code, stored on the computer recordable storage medium, for performing a bitwise OR operation between existing memory lock for same type of commands and incoming command bit mask to form a new memory region lock.

10. The computer program product of claim 9 further comprising:
    program code, stored on the computer recordable storage medium, for using the pending command locking mask to release the lock on the memory region associated with the pending input/output command in a single instruction in response to completing execution of the pending input/output command.

11. The computer program product of claim 9 further comprising:
   program code, stored on the computer recordable storage medium, for performing a bitwise inversion on the pending command locking mask to form a lock release mask in response to the pending input/output command completing execution; and
   program code, stored on the computer recordable storage medium, for performing the bitwise AND operation on the lock release mask and a pending command locking mask for a pending input/output command of the same type associated with the same memory region to release the lock on a set of cache lines of the memory region utilized by the pending input/output command.

12. The computer program product of claim 9 further comprising:
   executing a plurality of input/output commands associated with a common memory region in parallel, wherein each input/output command is represented by a bit field command mask in a set of bit field command masks.

13. The computer program product of claim 12, wherein locking and unlocking cache lines in the common memory region by the plurality of input/output commands is synchronized using the set of bit field command masks to prevent data corruption.

14. The computer program product of claim 9 further comprising:
   program code, stored on the computer recordable storage medium, for setting bits in a bit field to ones;
   program code, stored on the computer recordable storage medium, for shifting the bits left thirty-one minus an ending cache line number for an ending cache line in the memory region to mask off a set of upper bits;
   program code, stored on the computer recordable storage medium, for shifting the bits right thirty-one minus an ending cache line number plus a starting cache line number for a starting cache line in the memory region to mask a set of lower bits; and
   program code, stored on the computer recordable storage medium, for shifting the bits in the bit field left for the starting cache line number to form the incoming command mask representing the incoming input/output command.

15. A data processing system for synchronizing input/output commands, the data processing system comprising:
   a storage device containing program code; and
   a processor unit configured to execute the program code to create an incoming command mask representing an incoming input/output command associated with a memory region;
   perform a bitwise inversion operation on the incoming command mask to form a modified incoming command mask in response to a determination that another input/output command associated with the memory region is pending; perform a bitwise AND operation on the modified incoming command mask and the pending command mask to form a pending command locking mask associated with the pending input/output command, and perform a bitwise OR operation between existing memory lock for same type of commands and incoming command bit mask to form a new memory region lock.

16. The data processing system of claim 15, wherein the processor unit is further configured to execute the program code to use the pending command locking mask to release the lock on the memory region associated with the pending input/output command in a single instruction in response to completing execution of the pending input/output command.

17. The data processing system of claim 15, wherein the processor unit is further configured to execute the program code to execute a plurality of input/output commands associated with a common memory region in parallel, wherein each input/output command is represented by a bit field command mask in a set of bit field command masks.

18. The data processing system of claim 15, wherein locking and unlocking cache lines in the common memory region by the plurality of input/output commands is synchronized using the set of bit field command masks to prevent data corruption.

19. The data processing system of claim 15, wherein the processor unit is further configured to execute the program code to perform a bitwise inversion on the pending command locking mask to form a lock release mask in response to the pending input/output command completing execution; and perform a bitwise AND operation on the lock release mask and a pending command locking mask for a pending input/output command of the same type associated with the same memory region to release a lock on a set of cache lines of the memory region utilized by the first input/output command.

20. The data processing system of claim 15, wherein the processor unit is further configured to execute the program code to set bits in a bit field to ones; shift the bits left thirty-one minus an ending cache line number for an ending cache line in the memory region to mask off a set of upper bits; shift the bits right thirty-one minus an ending cache line plus a starting cache line number for a starting cache line in the memory region to mask a set of lower bits; and shift the bits in the bit field left for the starting cache line number to form the incoming command mask representing the incoming input/output command.

* * * * *